United States Patent [19]

Doherty et al.

[11] Patent Number: 5,333,184
[45] Date of Patent: Jul. 26, 1994

[54] CALL MESSAGE RECORDING FOR TELEPHONE SYSTEMS

[75] Inventors: Gerard P. Doherty, Yardley, Pa.; Nicholas J. Lanzillotti, White House Station; Conrad J. Paulus, Bridgewater, both of N.J.

[73] Assignee: AT&T Bell Laboratories, Murray Hill, N.J.

[21] Appl. No.: 879,669

[22] Filed: May 6, 1992

[51] Int. Cl.⁵ .................. H04M 15/00; H04M 7/00; H04M 3/00
[52] U.S. Cl. .................. 379/115; 379/113; 379/126; 379/229; 379/230; 379/243
[58] Field of Search ............... 379/113, 115, 128, 121, 379/126, 127, 140, 229, 230, 243

[56] References Cited

U.S. PATENT DOCUMENTS

| | | | |
|---|---|---|---|
| 3,816,663 | 6/1974 | Goodale | 379/126 |
| 4,007,336 | 2/1977 | Hutton, Sr. | 379/127 |
| 4,446,337 | 5/1984 | Cofer | 379/230 |
| 4,565,903 | 1/1986 | Riley | 379/201 |
| 4,932,042 | 5/1990 | Baral et al. | 379/230 |
| 5,003,584 | 3/1991 | Benyacar et al. | 379/127 |
| 5,095,505 | 3/1992 | Finucane et al. | 379/127 |
| 5,119,415 | 6/1992 | Aoyama | 379/230 |
| 5,134,647 | 7/1992 | Pugh et al. | 379/230 |
| 5,185,785 | 2/1993 | Funk et al. | 379/229 |

Primary Examiner—Stephen Chin
Assistant Examiner—Vijay Shankar
Attorney, Agent, or Firm—Ronald D. Slusky

[57] ABSTRACT

The standard exchange message interface (EMI) message record generated for interexchange telephone toll calls is enhanced via the addition of a primary interexchange carrier (PIC) indicator, whose value provides an indication as to whether a terminating subscriber has a particular interexchange carrier as his/her PIC. The PIC indicator may be used by the interexchange carrier when bills are rendered for its subscribers—for example, to provide different billing treatment for calls that were made over that carrier's network to terminating subscribers whose PIC is, in fact, that very carrier, as opposed to calls that were made to subscribers with a different PIC.

41 Claims, 5 Drawing Sheets

FIG. 2

| # | Field |
|---|---|
| 3410 | ORIGINATING TELEPHONE NUMBER |
| 3411 | TERMINATING TELEPHONE NUMBER |
| 3412 | BILLING TELEPHONE NUMBER |
| 3413 | START TIME |
| 3414 | ELAPSED TIME |
| 3415 | FROM_PLACE |
| 3416 | TO_PLACE |
| 3417 | MESSAGE TYPE |
| 3418 | CALL CHARGE |
| 3419 | PIC INDICATOR |
| 3420 | ⋮ |

FIG. 3

| TERMINATING SUBSCRIBER PIC'D TO CARRIER 30? | ORIGINATING SUBSCRIBER PIC'D TO CARRIER 30? | |
|---|---|---|
| | YES | NO |
| YES | SET | NOT SET |
| NO | NOT SET | NOT SET |

CALL MESSAGE RECORDING FOR TELEPHONE SYSTEMS

BACKGROUND OF THE INVENTION

The present invention relates to arrangements used in telephone networks for recording messages used to bill charges for interexchange calls.

Such arrangements operate by recording the relevant billing data for each toll call, or connection, in a so-called automatic message account, or AMA, message record. Typical message record fields are the originating and terminating telephone numbers and elapsed time of call. In a typical system, the message records, which are created for each call at a time substantially contemporaneous with the termination of the call, are transmitted from an originating switch to a message accumulation system. The latter distributes the accumulated messages to appropriate further processing systems which translate the AMA message records into the industry-standard "exchange message interface," or EMI, message record format. The EMI records are thereupon forwarded to a rating system which, inter alia, computes the toll charges applicable to the calls and adds an indication of those charges to the EMI record. The records thus formed are forwarded to a billing system in which they reside until processed to generate, typically, "hard copy" bills which are mailed to subscribers.

The invention more particularly relates to the generation of message records for long-distance—or so-called interexchange—calls, which involve the use of the facilities of a long-distance, or interexchange, carrier, also referred to as an IXC. In the United States, for example, AT&T, MCI and Sprint are three such IXCs. Each subscriber to local telephone service from a local exchange carrier, or LEC, such as New Jersey Bell, has an associated "primary interexchange carrier," or PIC, that was selected by or for the local subscriber. The local subscriber is said to be "PIC'd" to the associated IXC. When a long-distance call is initiated by the subscriber, the call is routed through the network of the originating subscriber's LEC, over the network of the PIC and, ultimately, through the network of the LEC which has as one of its subscribers the called party. At the termination of the call, a switch which carried the call—illustratively, a switch in the interexchange carrier's network—generates the AMA record as described above.

SUMMARY OF THE INVENTION

In accordance with the invention, it has been recognized that it may be advantageous for a message record to include a further piece of data, referred to herein as the "PIC indicator." The value of the PIG indicator is an indication as to whether the terminating subscriber has a particular interexchange carrier as his/her PIC. The PIC indicator may, for example, take the form of a code which actually identifies the terminating subscriber's PIC. Or it may be in the form of a flag, or indicator, which indicates, at a minimum, that the terminating subscriber's PIC is or is not a particular interexchange carrier or that, more specifically, the PIC for both the terminating and originating subscribers is a particular interexchange carrier.

In accordance with a feature of the invention, the PIC indicator may be used by an interexchange carrier when bills are rendered for its subscribers—for example, to provide different billing treatment for calls that were made over that carrier's network to terminating subscribers whose PIC is, in fact, that very carrier, as opposed to calls that were made to subscribers with a different PIC. This may be contrasted with a different approach used by at least one IXC within the United States wherein a different billing treatment is given to a subscriber of that IXC for calls made to a limited set of pre-identified subscribers who are also PIC'd to that IXC. That prior art approach does not embody the use of a PIC indicator in the call message record, as in the present invention. Rather, it relies on standard data processing techniques implemented at the time the monthly bill is generated to compare each called telephone number with the list of telephone numbers of the pre-identified subscribers.

In accordance with a further feature of the invention, the PIC indicator is advantageously added to the message record in the same system that performs the call rating—and at a time substantially contemporaneous with the rating itself—illustratively using a comprehensive database in which are stored the telephone numbers of all PIC subscribers of the interexchange carrier in question.

BRIEF DESCRIPTION OF THE DRAWING

FIG. 2 is a conceptual representation of an EMI record created by the interexchange carder;

FIG. 3 is a truth table illustrating the logic controlling the value of a PIC indicator included within the EMI record, in accordance with one embodiment of the invention;

DETAILED DESCRIPTION

Figure 1:
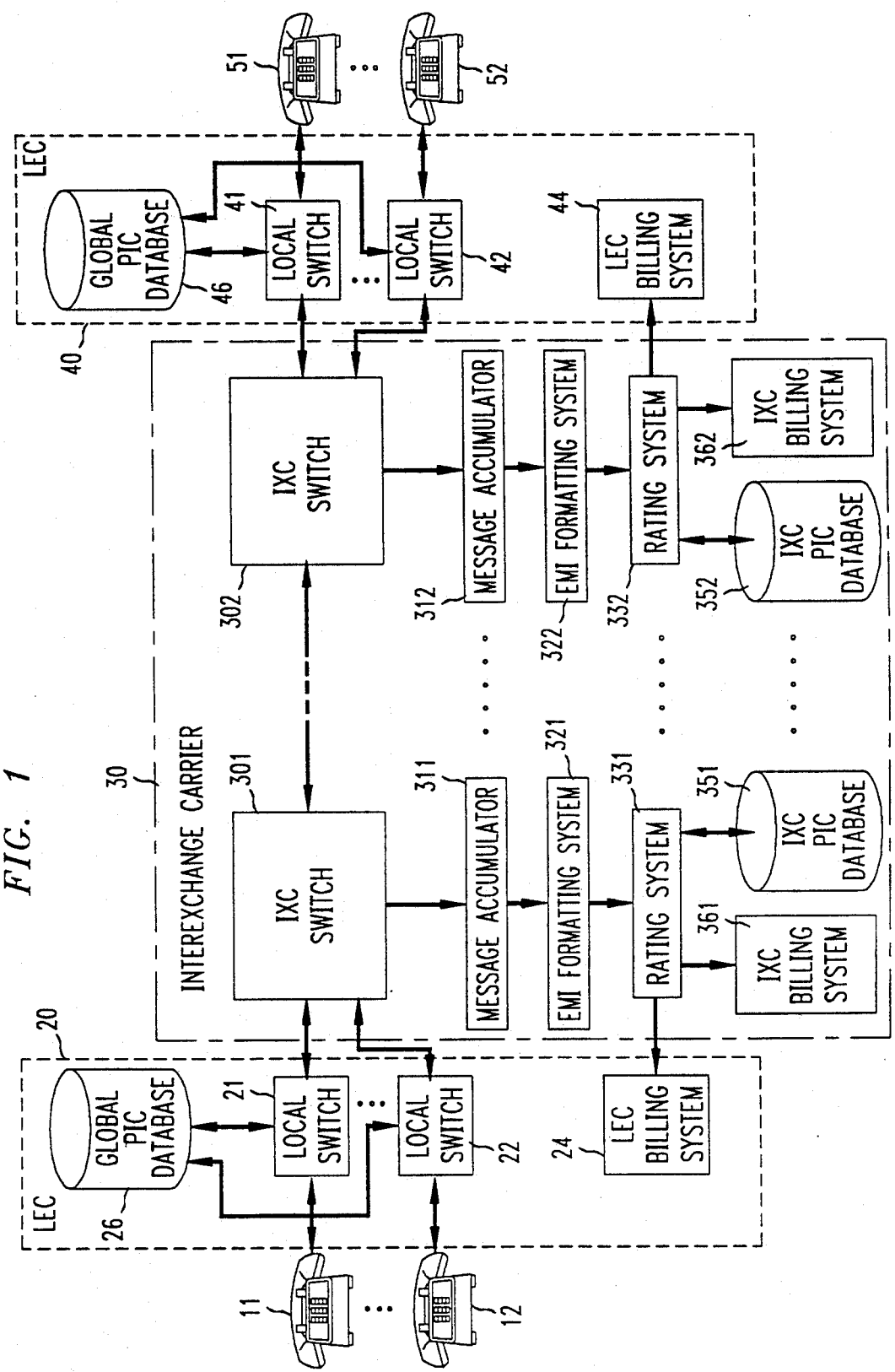
FIG. 1 illustrates an interconnection of local exchange carriers and an interexchange carrier embodying the principles of the invention.

In FIG. 1, a plurality of telephone subscribers 11 . . . 12 are provided with local exchange service by a local exchange carrier (LEC) 20. LEC 20 includes a plurality of local central office switches 21 . . . 22 which serve respective ones of the subscribers. When a long-distance call is initiated by a calling, or originating, one of the subscribers, say subscriber 11, the associated local switch 21 recognizes from the dialed telephone number—specifically the area code thereof—that this is, indeed, a long-distance call. As a pan of the processing of this call, switch 21 accesses a database 26 in which is stored an identification of the primary interexchange carrier, or PIC, for each of the LEC's subscribers. Inasmuch as database 26 has PIC information relating to all the interexchange carriers, or IXCs, to which it has access, the database is referred to herein as the "global" PIC database.

In this example, subscriber 11 is PIC'd to IXC 30. That is, IXC 30 is that subscriber's selected primary interexchange carrier. IXC 30 includes a network of interexchange carrier switches which are illustratively AT&T 4ESS ™ and 5ESS ® switches. The call is routed by local switch 21 to IXC 30 and, more particularly, to originating switch 301 therein. Within the network, the call is ultimately routed to IXC terminating switch 302. In being carried over the network, the call may have also been directed, for example, across various trunks and through various switching nodes (not shown), as is well known in the art.

Also shown in FIG. 1 is a LEC 40 which has as one of its subscribers the party to which the call in question is being directed. Similar to LEC 20, LEC 40 includes local switches 41 . . . 42 which serve respective LEC subscribers 51 . . . 52, as well as a global PIC database 46, which is used when outgoing long distance calls are made by subscribers 51 . . . 52. In this example, the terminating subscriber is subscriber 51. Accordingly, IXC carrier terminating switch 302 routes the call to local switch 41 which, in turn, passes the call to its connected subscriber 51. A connection between subscribers 11 and 51 is thus made, the connection including both LECs and the IXC.

At the completion of the call, IXC originating switch 301 generates the aforementioned AMA record for the call (connection). This switch is periodically polled, along with other like switches, by an associated one of message accumulator systems 311 . . . 312. In this example it is message accumulator system 311. Indeed, the principal function of each one of systems 311 . . . 312 is the accumulation of AMA records from the various switches that it serves.

On a periodic basis, on the order of several times a day, each message accumulator sends its accumulated AMA records to a corresponding one of EMI formatting systems 321 . . . 322. In this case, it is system 321. The latter translates the AMA records into the aforementioned industry-standard EMI message record format. The EMI records are thereupon periodically forwarded—again, on the order of several times a day—to a respective one of rating systems 331 . . . 332. In this case it is system 331. Among the functions of rating systems 331 . . . 332 is to "rate" each call, by which is meant the computation of the standard toll charges or rated charge, applicable to each call, and to add an indication of same to the EMI record.

FIG. 2 is a conceptual representation of an EMI record, some of the fields of which are completed by the EMI formatting systems and others of which are completed by the rating systems. (Other fields may be completed by yet other systems which process the EMI record.) The fields are shown, for pedagogic convenience, in an order that is different from that actually specified by the EMI standard, as will be appreciated by those skilled in the art.

As shown in FIG. 2, some of the more significant fields of the EMI record are the originating telephone number 3410 (i.e., the telephone number of subscriber 11); the terminating telephone number 3411 (i.e., the telephone number of subscriber 51); the billing telephone number 3412, which is typically the same as the originating telephone number but may be some other number as, for example, when a telephone calling card is used to pay for the call; the start time for the call 3413; the elapsed time 3414; the geographic call origination and termination points, e.g. Highland Park, N.J. and San Francisco, Calif., denoted as FROM_PLACE 3415 and TO_PLACE 3416; message type 3417, which indicates that the call was, for example, a direct-dialed domestic call, an operator-assisted international call, etc; call charge 3418, which is the standard dollar charge for the call computed as a function of various ones of the message characteristics recorded in the EMI message such as described above; PIC indicator 3419, in accordance with the invention; and various other data fields denoted at 3420.

The value of PIC indicator 3419, in particular, is an indication as to whether the PIC of the terminating subscriber of the call in question is IXC 30. In various embodiments, this indication may take the form of a code which actually identifies the terminating subscriber's PIC. Or the PIC indicator may simply be in the form of a flag, or indicator, which indicates, at a minimum, whether or not the terminating subscriber's PIC is IXC 30. In the present illustrative embodiment, however, PIC indicator 3419 is even more explicit than that. In particular, its value indicates whether or not both the terminating and originating subscribers' PIC is IXC 30.

It may be noted at this point that it is possible for a call to be routed by LEC 20 to IXC 30 even if the originating subscriber is not PIC'd to IXC 30. For example, a subscriber PIC'd to another IXC can instruct LEC 20 to route the call via IXC 30 by prefixing the called telephone number by an access code that identifies IXC 30.

A truth table illustrating the logic which controls the value of the PIC indicator is shown in FIG. 3. If both of the subscribers are PIC'd to IXC 30, then PIC indicator 3419 is set. Otherwise it is not set. Certainly, then, as noted above, the value of PIC indicator 3419 does indicate whether or not the PIC of the terminating subscriber is or is not IXC 30. Specifically, if PIC indicator 3419 is set, then IXC 30 is the terminating subscriber's PIC. If it is not set, then IXC 30 is not the terminating subscriber's PIC.

In this embodiment, the PIC indicator is illustratively provided in the standard EMI field known as the Indicator 25 field, which is dedicated to IXC-specific information.

Figure 7:
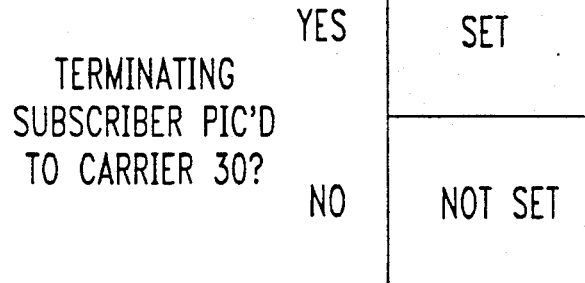
FIG. 7 is a truth table illustrating the logic controlling the value of a PIC indicator within the EMI record, in accordance with a second embodiment of the invention.

Advantageously, the value of PIC indicator 3419 can be used in subsequent billing operations (described below). For example, different billing treatments, e.g., discounts, might be provided for subscribers whose PIC is IXC 30, the discounts being determined as a function of the presence of a set PIC indicator in the various message records that are assembled to create that portion of the subsriber's overall monthly telephone bill that sets forth the charges for calls made over the network of IXC 30. In the present illustrative embodiment, IXC 30 wishes to give a discount for a call only if both the originating and terminating subscribers are PIC'd to IXC 30. The fact that an originating subscriber not PIC'd to IXC 30 may have chosen to use IXC 30 for a particular call by, for example, using the aforementioned access code, is illustratively not sufficient for IXC 30 to provide the aforementioned discount treatment. Hence the generation of PIC indicator 3419 in the manner described above. In other embodiments, an IXC may deem it sufficient for purposes of providing the discount that that IXC was the carrier that handled a call, as long as the terminating subscriber is PIC'd to the IXC. In such an embodiment, the PIC indicator would need not incorporate information about the originating subscribers' PICs. It would only need to incorporate information about the terminating subscribers' PICs. A truth table illustrating the logic which would control the value of the PIC indicator in that case is shown in FIG. 7.

Figure 4:
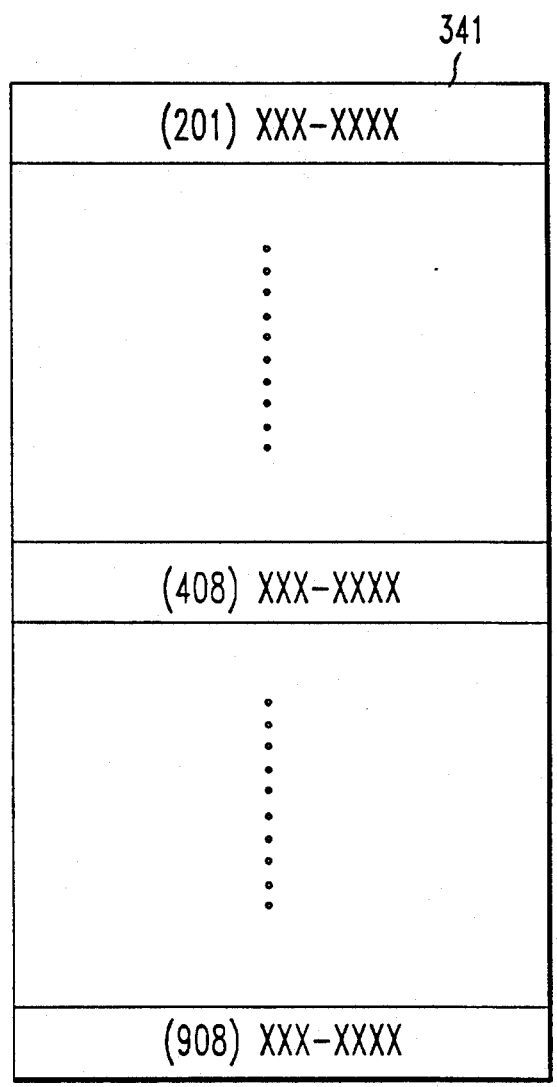
FIG. 4 is a conceptual representation of a database used in implementing the invention.

As shown in FIG. 1, IXC 30 further includes IXC PIC databases 351 . . . 352, which are accessed by respective ones of rating systems 331 . . . 332 in the process of generating the PIC indicators. These databases are replicas of one another, i.e., all contain the same information. Illustratively, that information is nothing more than a list of all, or at least substantially all, of the telephone numbers of subscribers of any LEC who are PIC'd to IXC 30. The database contents are represented conceptually in FIG. 4. As shown in FIG. 1, rating system 331 accesses database 351. In particular, it is possible that rating system 331 will use database 351 for determining whether IXC 30 is the PIC of both the originating and terminating telephone numbers. However, in this embodiment, rating system 331 has access to an independent, much smaller database (not shown) in which are stored all of the telephone numbers of subscribers whose message records are routinely processed by system 331 (as opposed to one of the other rating systems), all such subscribers necessarily having IXC 30 as their PIC. Thus rating system 331 can use this smaller database for purposes of determining whether the PIC of the originating number is IXC 30. On the other hand, the message records of various terminating subscribers are processed by various ones of the rating systems 331 . . . 332, depending on the location of those subscribers. For example, message records for subscriber 51 are processed by rating system 332. Therefore, each rating system, in order to generate the PIC indicator, needs to be able to access a comprehensive database in which all IXC 30 subscriber telephone numbers are stored. Database 351 serves this function for rating system 331.

Figure 5:
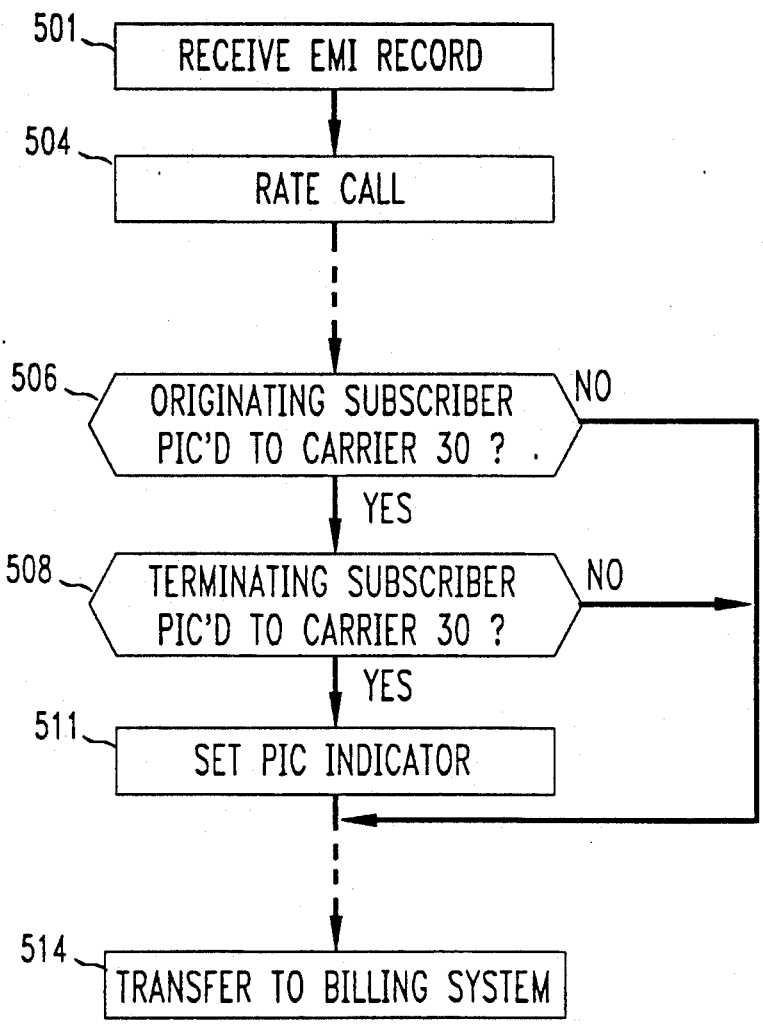
FIG. 5 is a flowchart of processing performed by a rating system within the interexchange carrier, including the generation of the PIC indicator.

FIG. 5 is a flowchart of the processing performed by rating system 331. The rating system receives the EMI record from EMI formatting system 321, as indicated at 501. The system then proceeds to "rate" the call, i.e., compute call charge 3418, as indicated at 504. Additional known functionalities may also be carried out by the rating system. Of interest here, however, is the generation of PIC indicator 3419. In particular, it is first determined at step 506 whether the originating subscriber is PIC'd to IXC 30. If not, there is no need to continue further inasmuch as PIC indicator 3419 will necessarily be in the "not set" state, as shown in FIG. 3. On the other hand, if the originating subscriber is PIC'd to IXC 30, then it is determined at step 508 whether the terminating subscriber is PIC'd to IXC 30. If the terminating subscriber is not PIC'd to IXC 30, then, again, PIC indicator 3419 will be left in the "not set" state. If, however, the terminating subscriber is PIC'd to IXC 30, then PIC indicator 3419 will be put in the "set" state, as indicated at step 511. After perhaps performing various other functions not relevant here, rating system 331 transfers, or transmits, the now rated and PIC-evaluated EMI message to a billing system for subsequent processing. (In the event that only the terminating subscriber's PIC is used to determine the state of the PIC indicator, as shown in FIG. 7, the flowchart of FIG. 5 would be modified to the extent of simply eliminating step 506.)

There are at least two possible types of billing systems to which the EMI messages may be transferred by rating system 331. Each LEC includes a LEC billing system, such as LEC billing systems 24 and 44 within LECs 20 and 40, respectively. To the extent that call charges from IXC 30 are included within the bills rendered by a subscriber's LEC, the EMI records for calls to be billed to that subscriber are transferred to a LEC billing system. Alternatively, IXC 30 may render separate bills to at least ones of its subscribers. The EMI records for calls to be billed to such subscribers, instead of being transferred to a LEC billing system, are transferred to one of IXC billing systems 361 . . . 362 maintained and operated by the carrier itself. IXC billing system 361, for example, serves rating system 331 in this regard. IXC billing system 361 may thereupon print and mail a separate bill for IXC 30 charges. Alternatively, instead of printing and mailing its own bills for calls whose EMI records were transferred to IXC billing system 361, IXC 30 may use its billing system to totalize the bills—and in the process, apply any applicable discounts—and then provide an invoice in electronic form to the LEC billing system for ultimate printing of the bill and inclusion thereof in the overall billing package mailed to the subscriber.

Figure 6:
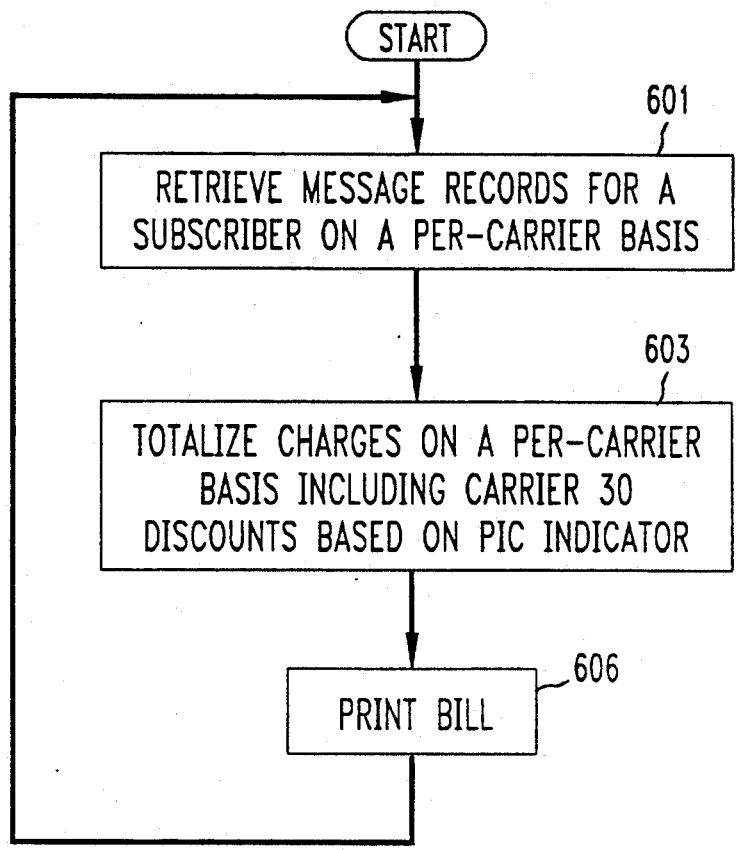
FIG. 6 is a simplified flowchart of processing performed in rendering printed bills for subscribers of one of the local exchange carriers.

FIG. 6 is a simplified flowchart of the processing performed by, for example, LEC billing system 24 in the rendering of printed bills on, for example, a monthly basis. At step 601 the message records for a particular subscriber are retrieved from memory on a per-carrier basis (the carriers including not only any interexchange carrier that the subscriber may have used during the billing period but also the local exchange carrier itself). Next, as indicated at step 603, the charges are totalized on a per carrier basis. In the totalization of the charges from IXC 30, in particular, the PIC indicators in the message records are used as the basis for applying any desired special billing treatment, such as a discount for those calls whose PIC indicator is in the "set" state. Thus, in that case, a subscriber PIC'd to IXC 30 will receive a discount for long-distance calls made to another subscriber who is also PIC'd to IXC 30. The discount percentage may be based, for example, on the total dollar volume of the calls in question. Finally, the LEC billing system prints the bill for this subscriber at step 606 and then returns to step 601 to begin the processing for the next subscriber.

The forgoing merely illustrates the principles of the invention. Thus, for example, although the invention is illustrated in the context of a particular type of billing environment made up of various discrete systems, those skilled in the art will be able to implement the invention in any of a variety of telephone billing environments.

Moreover, the invention is applicable to IXC calls made made both a) between so-called local access and transport areas, or lata's—a so-called inter-lata call, and b) within an individual lata (to the extent that intra-lata IXC facilities are actually available)—a so-called intra-lata call. Thus in the illustrative embodiment of FIG. 1, IXC originating and terminating switches 301 and 302 may be within the same lata or in different lata's. Subscribers may be PIC'd to one carrier for inter-lata calls and to another carrier (which may be, for example, an IXC or a LEC) for intra-lata calls, as would be reflected in the global databases maintained by the LECs. In this context, the term "long-distance" call simply refers to any call carried by an IXC.

It will thus be appreciated that those skilled in the art will be able to devise numerous arrangements which, although not explicitly shown or described herein, embody the principles of the invention and are within its spirit and scope.

We claim:

1. A method for use in a telecommunications system in which interexchange calls initiated by each subscriber are automatically routed over the facilities of a particular one of a plurality of interexchange carriers associated with that subscriber, said method comprising the steps of:
   generating a message record for an interexchange call between an originating subscriber and a terminating subscriber, and
   including, in said message record, a primary interexchange carrier (PIC) indicator having a value which is a function of whether or not the interexchange carrier associated with said terminating subscriber is a predetermined one of said interexchange carriers.

2. The invention of claim 1 wherein said value of said PIC indicator is a further function of whether or not the interexchange carrier associated with said originating subscriber is said predetermined one of said interexchange carriers.

3. The invention of claim 2 wherein said predetermined one of said interexchange carriers is the interexchange carrier over whose facilities said call was routed.

4. The invention of claim 1 wherein said including step comprises the step of accessing a database in which are stored the telephone numbers of substantially all of the subscribers associated with said predetermined one of said interexchange carriers.

5. The invention of claim 1 comprising the further step of transmitting each said message record to a billing system.

6. The invention of claim 1 comprising the further step of billing at least ones of said calls as a function of the value of the PIC indicator in the message record generated for each one of those calls.

7. The invention of claim 1 wherein said message record is an exchange message interface (EMI) message record.

8. The invention of claim 1 wherein said PIC indicator has a particular value when the interexchange carrier associated with said terminating subscriber is the interexchange carrier over whose facilities said call was routed, wherein said message record generating step includes the step of rating said call to determine a rated charge therefor and wherein said method includes the further step of billing an amount for said call which is less than said rated charge if the PIC indicator in the message record generated for said call has said particular value.

9. The invention of claim 8 wherein said message record generating step includes the steps of generating an automatic message account (AMA) message record for said call, converting said AMA message record into an exchange message interface (EMI) message record, transmitting the EMI message record to a call rating system, and rating said call in said call rating system, said including step being carried out by said call rating system and substantially contemporaneously with said call rating step.

10. The invention of claim 2 wherein said PIC indicator has a particular value when the interexchange carrier associated with both said terminating subscriber and said originating subscriber is the interexchange carrier over whose facilities said call was routed, wherein said message record generating step includes the step of rating said call to determine a rated charge therefor and wherein said method includes the further step of billing an amount for said call which is less than said rated charge if the PIC indicator in the message record generated for said call has said particular value.

11. The invention of claim 10 wherein said message record generating step includes the steps of generating an automatic message account (AMA) message record for said call, converting said AMA message record into an exchange message interface (EMI) message record, transmitting the EMI message record to a call rating system, and rating said call in said call rating system, said including step being carried out by said call rating system and substantially contemporaneously with said call rating step.

12. A method for use in a telecommunications system in which each subscriber has a primary interexchange carrier (PIC) over which interexchange calls initiated by that subscriber are carried, said method comprising the steps of:
   generating a message record for each interexchange call between an originating subscriber and a terminating subscriber for which a charge is to be imposed, and
   providing, in said message record, an indication which has a particular value when the particular interexchange carrier over which said call was carried is the PIC for said terminating subscriber.

13. The invention of claim 12 wherein said providing step includes the step of accessing a database in which are stored the telephone numbers of substantially all of the subscribers associated with said particular interexchange carrier.

14. The invention of claim 13 comprising the further step of transmitting each said message record to a billing system.

15. The invention of claim 13 comprising the further step of billing at least ones of said calls as a function of the value of said indication in the message record for each one of those calls.

16. The invention of claim 15 wherein said message record generating step includes the step of rating said each call to determine a rated charge therefor and wherein said billing step includes billing an amount for ones of said calls which is less than said rated charge if the indications in the message records for such calls have said particular value.

17. The invention of claim 16 wherein said message record generating step includes the steps of generating an automatic message account (AMA) message record for said call, converting said AMA message record into an exchange message interface (EMI) message record, transmitting the EMI message record to a call rating system, and rating said call in said call rating system, said indication providing step being carried out by said rating system and substantially contemporaneously with said call rating step.

18. A method for use in a telecommunications system in which each subscriber has a primary interexchange carrier (PIC) over which interexchange calls initiated by that subscriber are carried, said method comprising the steps of:
   generating a message record for each interexchange call between an originating subscriber and a terminating subscriber for which a charge is to be imposed, and
   providing, in said message record, an indication which has a particular value when the particular interexchange carrier over which said call was carried is the PIC for said terminating subscriber and is also the PIC for said originating subscriber.

19. The invention of claim 18 wherein said providing step includes the step of accessing a database in which are stored the telephone numbers of substantially all of the subscribers associated with said particular interexchange carrier.

20. The invention of claim 19 comprising the further step of transmitting each said message record to a billing system.

21. The invention of claim 19 comprising the further step of billing at least ones of said calls as a function of the value of said indication in the message record for each one of those calls.

22. The invention of claim 21 wherein said message record generating step includes the step of rating said each call to determine a rated charge therefor and wherein said billing step includes billing an amount for ones of said calls which is less than said rated charge if the indications in the message records for such calls have said particular value.

23. The invention of claim 22 wherein said message record generating step includes the steps of generating an automatic message account (AMA) message record for said call, converting said AMA message record into an exchange message interface (EMI) message record, transmitting the EMI message record to a call rating system, and rating said call in said call rating system, said indication providing step being carried out by said rating system and substantially contemporaneously with said call rating step.

24. A method for use in a telecommunications system comprised of local exchange carriers and interexchange carriers, said system being arranged to establish telephone connections between subscribers of said local exchange carriers in response to requests for same, some of said connections including said interexchange carriers, each local exchange including a database in which is stored, for each subscriber of that local exchange carrier, the identity of a particular one of said interexchange carriers associated with that subscriber, and each local exchange carrier being arranged to respond to said requests by a) determining for each request whether the requested connection needs to include one of said interexchange carriers; b) if it does, for accessing said database to identify the interexchange carrier associated with the requesting subscriber; and c) including the identified interexchange carrier in the connection, said method comprising the steps of:

generating an exchange message interface (EMI) message record for at least each connection between an originating subscriber and a terminating subscriber which includes a particular one of said interexchange carriers and for which a charge is to be billed, and providing, in said EMI message record, a primary exchange carrier (PIC) indicator whose value is a function of whether or not the particular interexchange carrier included in said each connection is the interexchange carrier associated with said terminating subscriber.

25. The invention of claim 24 wherein said value of said PIC indicator is a further function of whether or not the particular interexchange carrier included in said each connection is the interexchange carrier associated with said originating subscriber.

26. The invention of claim 24 wherein said providing step comprises the step of accessing a database in which are stored the telephone numbers of substantially all of the subscribers associated with said particular interexchange carrier.

27. The invention of claim 26 comprising the further step of computing charges for at least ones of said connections as a function of the value of the PIC indicator in the message record generated for those connections.

28. The invention of claim 26 wherein said PIC indicator has a particular value when the interexchange carrier associated with said terminating subscriber is said particular interexchange carder, wherein said message record generating step includes the step of rating said each connection to determine a rated charge therefor and wherein said method includes the further step of computing as said charge to be billed a charge which is less than said rated charge if the PIC indicator in the message record generated for said each connection has said particular value.

29. The invention of claim 24 wherein said PIC indicator has a particular value when the interexchange carrier associated with both said terminating subscriber and said originating subscriber is wherein said message record generating step includes the step of rating said each connection to determine a rated charge therefor and wherein said method includes the further step of computing as said charge to be billed a charge which is less than said rated charge if the PIC indicator in the message record generated for said each connection has said particular value.

30. Apparatus for use in a telecommunications system in which interexchange calls initiated by each subscriber are automatically routed over the facilities of a particular one of a plurality of interexchange carriers associated with that subscriber, said apparatus comprising:

means for generating a message record for an interexchange call between an originating subscriber and a terminating subscriber, and means for providing in said message record a primary exchange carrier (PIC) indicator having a value which is a function of whether or not the interexchange carrier associated with said terminating subscriber is a predetermined one of said interexchange carriers.

31. The invention of claim 30 wherein said predetermined one of said interexchange carriers is the interexchange carrier over whose facilities said call was routed.

32. The invention of claim 31 further comprising a database in which are stored the telephone numbers of substantially all of the subscribers associated with said predetermined one of said interexchange carriers and wherein said providing means is arranged to access said database in the course of determining a value for said PIC indicator.

33. The invention of claim 32 further comprising means for billing at least ones of said calls as a function of the value of the PIC indicator in the message record generated for each one of those calls.

34. The invention of claim 30 wherein said PIC indicator has a particular value when the interexchange carrier associated with said terminating subscriber is the interexchange carrier over whose facilities said call was routed, wherein said message record generating means is arranged to rate said call to determine a rated cost therefor and wherein said apparatus further includes means for billing an amount for said call which is less than said rated cost if the PIC indicator in the message record generated for said call has said particular value.

35. The invention of claim 30 wherein said value of said PIC indicator is a further function of whether or not the interexchange carder associated with said originating subscriber is said predetermined one of said interexchange carriers.

36. The invention of claim 35 wherein said predetermined one of said interexchange carriers is the interexchange carrier over whose facilities said call was routed.

37. The invention of claim 36 further comprising a database in which are stored the telephone numbers of substantially all of the subscribers associated with said predetermined one of said interexchange carriers and wherein said providing means is arranged to access said database in the course of determining a value for said PIC indicator.

38. The invention of claim 37 further comprising means for billing at least ones of said calls as a function of the value of the PIC indicator in the message record generated for each one of those calls.

39. The invention of claim 36 wherein said PIC indicator has a particular value when the interexchange carrier associated with both said terminating subscriber and said originating subscriber is the interexchange carrier over whose facilities said call was routed, wherein said message record generating means is arranged to rate said call to determine a rated cost therefor and wherein said apparatus further includes means for billing an amount for said call which is less than said rated cost if the PIC indicator in the message record generated for said call has said particular value.

40. A method for use in a telecommunications system in which interexchange calls initiated by each subscriber are automatically routed over the facilities of a particular one of a plurality of interexchange carriers associated with that subscriber, said method comprising the steps of:
generating a message record for an interexchange call between an originating subscriber and a terminating subscriber,
accessing a database in which are stored the telephone numbers of substantially all of the subscribers associated with the specific one of said interexchange carriers over which said call was routed to make a determination as to whether or not the interexchange carrier associated with said terminating subscriber is said specific interexchange carrier over whose facilities said call was routed,
establishing an indicator for said call at a particular value when said determination is that the interexchange carrier associated with said terminating subscriber is said specific interexchange carrier over whose facilities said call was routed, and
providing an output which is a function of both information in said message record and of said indicator.

41. The method of claim 40 wherein said processing step includes the steps of:
rating said call as a function of information in said message record to determine a rated charge therefor, and
billing an amount for said call which is less than said rated charge if said indicator has said particular value.

* * * * *